(12) United States Patent
DeBruler et al.

(10) Patent No.: US 9,701,170 B2
(45) Date of Patent: Jul. 11, 2017

(54) DAMPER ROD BUSHINGS AS WELL AS GAS SPRING AND DAMPER ASSEMBLIES AND METHODS INCLUDING SAME

(71) Applicant: Firestone Industrial Products Company, LLC, Indianapolis, IN (US)

(72) Inventors: Brian S. DeBruler, Noblesville, IN (US); Pradipta N. Moulik, Carmel, IN (US); Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/671,257

(22) Filed: Mar. 27, 2015

(65) Prior Publication Data

US 2015/0273968 A1 Oct. 1, 2015

Related U.S. Application Data

(60) Provisional application No. 61/972,198, filed on Mar. 28, 2014.

(51) Int. Cl.
*B60G 15/12* (2006.01)
*B23P 15/00* (2006.01)
(Continued)

(52) U.S. Cl.
CPC .............. *B60G 15/12* (2013.01); *B23P 15/00* (2013.01); *B60G 15/14* (2013.01); *F16F 9/04* (2013.01); *F16F 9/54* (2013.01); *F16F 9/585* (2013.01); *F16F 13/002* (2013.01); *B23P 2700/14* (2013.01); *B60G 2202/314* (2013.01); *B60G 2204/1262* (2013.01); *B60G 2206/80* (2013.01); *Y10T 29/49615* (2015.01); *Y10T 403/451* (2015.01)

(58) Field of Classification Search
CPC .. B60G 15/12; B60G 15/14; F16F 9/04; F16F 9/54; F16F 9/585; F16F 13/002
USPC ........................ 267/64.21, 64.23, 64.24, 220; 188/321.11
See application file for complete search history.

(56) References Cited

U.S. PATENT DOCUMENTS 4,462,608 A * 7/1984 Lederman ............ B60G 15/068
267/220
4,592,540 A * 6/1986 Yokoya .................. B60G 17/04
188/319.1

(Continued)

*Primary Examiner* — Melanie Torres Williams
(74) *Attorney, Agent, or Firm* — Thomas R. Kingsbury; Fay Sharpe LLP

(57) ABSTRACT

A damper rod bushing operatively connects an end member of a gas spring and a damper rod of a damper to at least partially form a gas spring and damper assembly. The damper rod bushing is constructed for exposure to gas pressure within a spring chamber of a gas spring and damper assembly such that pre-load forces due to gas pressure within said spring chamber act on said damper rod bushing. The damper rod bushing can include an outer support element, an inner support element and an elastomeric connector element operatively connected between the outer and inner support elements such that a substantially fluid-tight seal is formed therebetween. A gas spring and damper assembly including such a damper rod bushing, as well as a suspension system including one or more of such gas spring and damper assemblies and a method of assembly are also included.

16 Claims, 7 Drawing Sheets

(51) Int. Cl.
*F16F 13/00* (2006.01)
*B60G 15/14* (2006.01)
*F16F 9/54* (2006.01)
*F16F 9/58* (2006.01)
*F16F 9/04* (2006.01)

(56) References Cited

U.S. PATENT DOCUMENTS

| | | | | |
|---|---|---|---|---|
| 4,673,171 A | * | 6/1987 | Buma | B60G 11/30 188/266.3 |
| 4,712,775 A | * | 12/1987 | Buma | B60G 11/30 267/220 |
| 4,934,667 A | * | 6/1990 | Pees | B60G 11/64 188/322.17 |
| 6,007,061 A | * | 12/1999 | Kammel | B60G 15/068 188/321.11 |
| 6,361,027 B1 | * | 3/2002 | Lun | F16F 9/58 267/122 |
| 6,764,066 B2 | * | 7/2004 | Graeve | B60G 13/003 188/321.11 |
| 2007/0170684 A1 | * | 7/2007 | Ohkita | B60G 15/063 280/124.147 |

\* cited by examiner

DAMPER ROD BUSHINGS AS WELL AS GAS SPRING AND DAMPER ASSEMBLIES AND METHODS INCLUDING SAME

BACKGROUND

The subject matter of the present disclosure broadly relates to the art of gas spring and damper devices and, more particularly, to damper rod bushings dimensioned for securement along an associated end member of an associated gas spring and damper assembly and constructed to accommodate pre-loading associated with direct exposure to pressurized gas contained within the spring chamber of the assembly. Gas spring and damper assemblies can include such a damper rod bushing, and suspension systems can include one or more of such gas spring and damper assemblies. Additionally, damper rod bushings in accordance with the subject matter of the present disclosure can be used in connection with methods of manufacturing gas spring and damper assemblies.

The subject matter of the present disclosure may find particular application and use in conjunction with components for suspension systems of wheeled vehicles, and will be shown and described herein with reference thereto. It is to be appreciated, however, that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Gas spring and damper assemblies are well known and commonly used. Known gas spring and damper assemblies typically include a gas spring assembly and a damper (e.g., a hydraulic or fluid damper). The gas spring assembly can include opposing end members and a flexible bellows or sleeve secured therebetween to define a spring chamber suitable for containing a quantity of pressurized gas. The damper can include a damper housing and a damper piston located within the housing. A damper rod is connected to the damper piston and projects from the damper housing so that the damper piston and rod can undergo reciprocal motion relative to the damper housing.

In an assembled condition, the damper rod and damper housing extend into and through the gas spring assembly. Typically, the damper rod is connected to one of the end members of the gas spring assembly and the damper housing is connected to the other end member of the gas spring assembly. As such, at least a portion of each of the damper rod and the damper housing is typically exposed to the pressurized gas within the spring chamber of the gas spring assembly.

In conventional constructions, a damper rod bushing of a known design will be secured between and operatively connect the end member and the damper rod. Forces and loads experienced during use of the gas spring and damper assembly are transmitted between the end member and damper rod by the damper rod bushing. Additionally, conventional constructions include a seal assembly that is disposed between the end member and the damper rod. Typically, the seal assembly will form a substantially fluid-tight seal with both the end member and the damper rod, and will be fluidically disposed between the spring chamber and the damper rod bushing. As result, conventional damper rod bushings are designed for use in fluid isolation with respect to the pressurized gas within the spring chamber of the gas spring assembly. Accordingly, conventional damper rod bushings are constructed for use in isolation from pre-load forces associated with exposure to the pressurized gas within the spring chamber of the gas spring assembly. As such, direct exposure of known damper rod bushings to pressurized gas from the spring chamber can have an undesirable influence on the performance and operating characteristics of conventional damper rod bushings.

As described above, conventional damper rod bushings are typically used together with a seal assembly that fluidically isolates the damper rod bushing from the pressurized gas of the spring chamber of the gas spring. Notwithstanding the common usage and overall success of conventional designs, it is believed desirable to develop damper rod bushing constructions suitable for use without a sealing assembly, such as may provide for improved packaging and reduced mounting envelopes, reduced weight, reduced costs of manufacture and/or assembly and/or such as may otherwise advance the art of gas spring and damper devices.

BRIEF SUMMARY

One example of a damper rod bushing in accordance with the subject matter of the present disclosure can include an inner support element and an outer support element. The inner support element can include an element wall with an inside surface at least partially defining a passage through the inner support element. A flange wall portion can extend outwardly from along the element wall toward an outer peripheral edge. The outer support element can be spaced radially outward and can be axially coextensive with at least a portion of the inner support element. An elastomeric connecting element can extend between and operatively connect the inner and outer support elements such that a substantially fluid-tight seal is formed therebetween. The elastomeric connecting element can be configured such that during use under a pre-load force from pressurized gas, the damper rod bushing will exhibit an approximately linear rate of change of the deflection force thereof over a range of axial deflection in at least one direction.

Another example of a damper rod bushing in accordance with the subject matter of the present disclosure can be dimensioned to operatively connect an associated end member of an associated gas spring and an associated damper rod of an associated damper. The damper rod bushing can include a first end and a second end such that a longitudinal axis extends therebetween. The damper rod bushing can also include an outer support element that can include an outer element wall with an inner surface and an outer surface dimensioned for receipt in abutting engagement with the associated end member. The damper rod bushing can further include an inner support element that is axially coextensive with at least a portion of the outer support element. The inner support element can include an inner element wall with an outer surface and an inner surface at least partially defining a passage through the inner support element that is dimensioned to receivingly engage the associated damper rod. The inner support element can extend between opposing end surfaces and include a flange wall portion projecting radially outward beyond the outer surface to an outer peripheral edge. The flange wall portion can include a first side surface disposed toward the first end surface and a second side surface disposed toward the second end surface. The flange wall portion can have a flange cross-sectional dimension (DF) across the outer peripheral edge. The flange wall portion can be disposed in spaced relation to the opposing end surfaces such that at least the second side surface is axially offset from the second end surface by a flange offset dimension (OFF). The damper rod bushing can also include an elastomeric connector element extending between the outer support element and the inner support element. The elastomeric connector element can be permanently attached to the inner surface of the outer support element along an annular joint that can extend axially in cross-sectional profile between a first attachment point disposed toward the first end of the damper rod bushing and a second attachment point disposed toward the second end of the elastomeric bushing assembly. The elastomeric connector element can be permanently attached to at least a portion of the outer surface of the inner support element such that a substantially fluid-tight seal is formed therebetween. The elastomeric connector element can include a first outer edge disposed along the outer support element toward the first end of the elastomeric bushing element. The first outer edge can include a cross-sectional profile with a radius of curvature (R1) and that can define an outermost axial extent of the first outer edge. The radius of curvature can have a centerpoint spaced inward from the inner surface of the outer support element by a radius offset dimension (D1). The outermost axial extent of the first outer edge can be axially offset from the first attachment point by a first unsecured edge dimension (D2). A second outer edge can be disposed along the outer support element toward the second end of the elastomeric bushing element. The second outer edge can include an outermost axial extent axially offset from the second attachment point by a second unsecured edge dimension (D3). The elastomeric connector element can also include a base surface that can extend radially inward from along the second outer edge in abutting engagement along the associated end member such that the base surface has a cross-sectional profile with a base surface engagement dimension (D4).

One example of a gas spring and damper assembly in accordance with the subject matter of the present disclosure can include a first end member and a second end member that is disposed in spaced relation to the first end member such that a longitudinal axis extends therebetween. A flexible spring member can include a flexible wall that extends longitudinally between opposing first and second ends. The first end can be operatively attached to the first end member such that a substantially fluid-tight seal is formed therebetween. The second end can be operatively attached to the second end member such that a substantially fluid-tight seal is formed therebetween. The flexible spring member and first and second end members can at least partially define a spring chamber. A damper can include a damper housing and a damper rod operatively connected with the damper housing such that the damper can generate reciprocal damping motion between the damper housing and the damper rod. An elastomeric bushing can be operatively connected between the damper rod and the first end member such that forces acting on one of the damper rod and the first end member are transmitted or otherwise communicated through the damper rod bushing to the other of the damper rod and the first end member. The damper rod bushing can be disposed in fluid communication with the spring chamber such that pre-load forces due to gas pressure within the spring chamber act on the damper rod bushing. The damper housing can be operatively connected with the second end member.

Another example of a gas spring and damper assembly in accordance with the subject matter of the present disclosure can include a gas spring, a damper and a damper rod bushing. The gas spring can having a longitudinal axis and can include a first end member and a second end member that is spaced axially from the first end member. A flexible spring member extends peripherally about the longitudinal axis between opposing first and second ends. The first end can be secured on the first end member such that a substantially fluid-tight seal is formed therebetween and the second end secured on the second end member such that a substantially fluid-tight seal is formed therebetween with a spring chamber at least partially defined by the flexible spring member and the first and second end members. The damper can extend longitudinally between and operatively connect the first and second end members such that at least a portion of the damper extends through the spring chamber. The damper can include a damper housing operatively connected to the first end member. The damper housing can include a housing wall that at least partially defines a damping chamber. A damper rod assembly can include a damper rod and a damper piston. The damper rod can extend axially between a first end and a second end. The damper piston can be operatively secured to the second end of the damper rod. The damper rod assembly can be operatively engaged with the damper housing such that the damper piston is disposed within the damping chamber with at least the first end of the damper rod projecting outwardly from the damper housing. In such case, the damper rod assembly and damper housing can undergo reciprocal motion relative to one another. A damper rod bushing can operatively connect the second end member of the gas spring and the first end of the damper rod assembly of the damper with at least a portion of the damper rod bushing disposed in fluid communication with the spring chamber such that pre-load forces due to gas pressure within the spring chamber act on the damper rod bushing.

One example of a suspension system in accordance with the subject matter of the present disclosure can include a pressurized gas system including a pressurized gas source and a control device in fluid communication with the pressurized gas source. At least one gas spring and damper assembly in accordance with either one of the two foregoing paragraphs can be disposed in fluid communication with the pressurized gas source with the control device disposed in fluid communication therebetween.

One example of a method of manufacturing a gas spring and damper assembly in accordance with the subject matter of the present disclosure can include providing a flexible spring member that includes a flexible wall having a longitudinal axis. The flexible spring member can extend peripherally about the axis and longitudinally between a first end and a second end opposite the first end. The method can also include providing a first end member and securing the first end member to the first end of the flexible wall. The method can further include providing a second end member and securing the second end member to the second end of the flexible wall to at least partially form a gas spring with a spring chamber that is at least partially defined by the flexible spring member between the first and second end member. The method can also include providing a damper that includes a damper housing and a damper rod operatively connected with one another such that the damper can generate reciprocal damping motion between the damper housing and the damper rod. The method can further include arranging the gas spring and damper such that the damper rod is positioned adjacent the first end member and such that the damper housing is positioned adjacent the second end member. The method can further include providing a damper rod bushing and operatively connecting the damper rod bushing between the first end member and the damper rod such that the damper rod bushing is in direct fluid communication with the spring chamber of the gas spring and such that pre-load forces due to gas pressure within the spring chamber can act on the damper rod bushing. The method can also include securing the second end member and the damper housing to one another.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
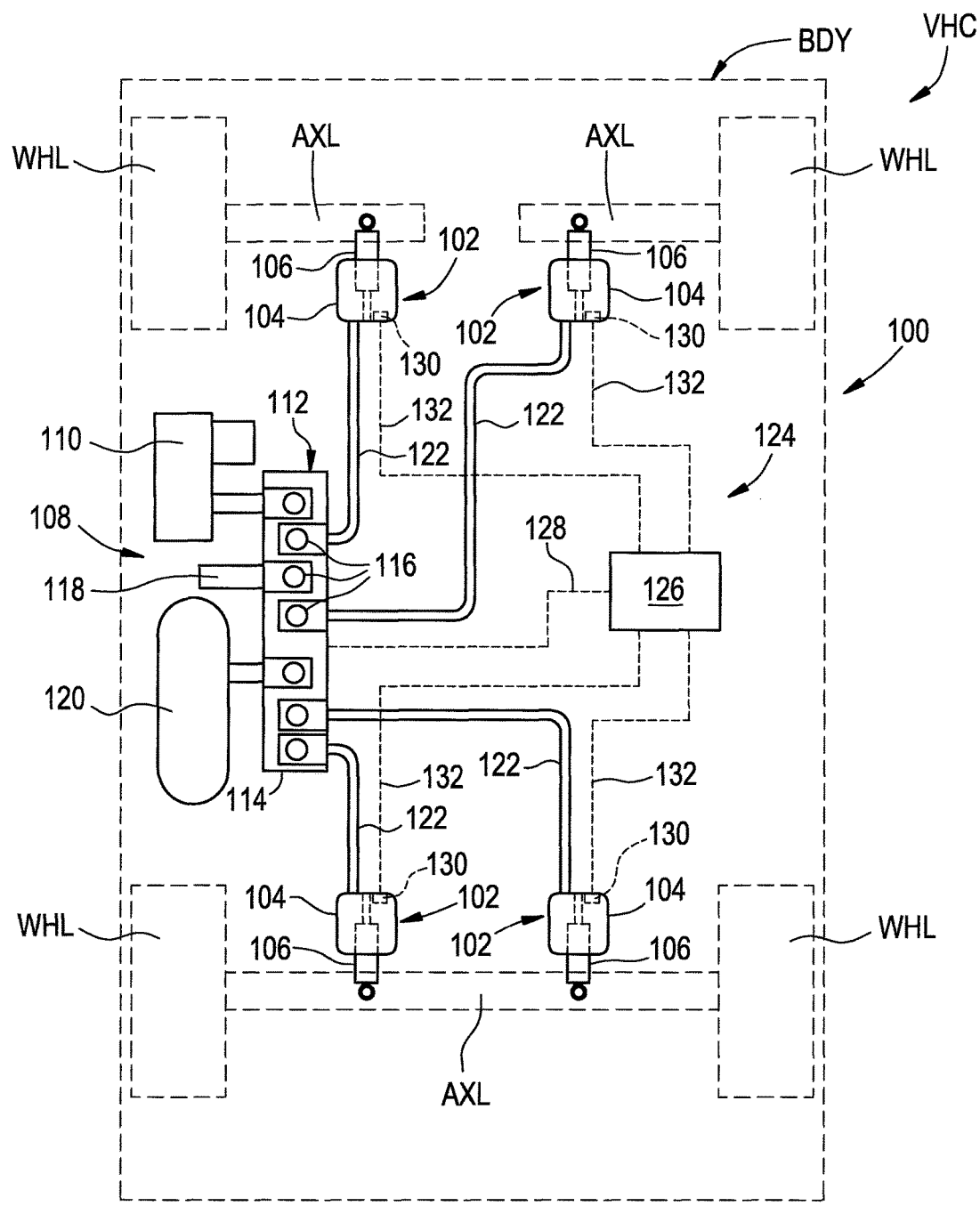
FIG. 1 is a schematic representation of one example of a suspension system of an associated vehicle including at least one gas spring and damper assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

The suspension system can include any combination spring and damper devices operatively disposed between the sprung and unsprung masses of the associated vehicle. For example, a suspension system can include one or more gas spring and damper assemblies in accordance with the subject matter of the present disclosure. In many cases, two or more of such gas spring and damper assemblies in accordance with the subject matter of the present disclosure may be used. Additionally, in some cases, one or more spring (e.g., gas spring assemblies, coil spring assemblies, torsion bar assemblies) and one or more dampers (e.g., conventional shock absorbers or struts) can, optionally, be provided as separate components.

In the arrangement shown in FIG. 1, suspension system 100 includes four gas spring and damper assemblies 102, one of which is disposed toward each corner of the associated vehicle adjacent a corresponding wheel WHL. However, it will be appreciated that any other suitable number of gas spring and damper assemblies could alternately be used in any other configuration and/or arrangement, such as has been discussed above, for example. As shown in FIG. 1, gas spring and damper assemblies 102 are supported between axles AXL and body BDY of associated vehicle VHC, and include a gas spring 104 and a damper 106. It will be recognized that gas springs 104 are shown and described in connection with FIG. 1 as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring assemblies for selectively supplying pressurized gas (e.g., air) thereto and selectively transferring pressurized gas therefrom. In the exemplary embodiment shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas.

Valve assembly 112 is in communication with gas springs 104 of assemblies 102 through suitable gas transfer lines 122. As such, pressurized gas can be selectively transferred into and/or out of the gas springs through valve assembly 112 by selectively operating valves 116, such as to alter or maintain vehicle height at one or more corners of the vehicle, for example.

Suspension system 100 can also include a control system 124 that is capable of communication with any one or more systems and/or components (not shown) of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

Control system 124 can also, optionally, include one or more height (or distance) sensing devices 130, such as, for example, may be operatively associated with the gas spring assemblies and capable of outputting or otherwise generating data, signals and/or other communications having a relation to a height of the gas spring assemblies or a distance between other components of the vehicle. Height sensing devices 130 can be in communication with ECU 126, which can receive the height or distance signals therefrom. The height sensing devices can be in communication with ECU 126 in any suitable manner, such as through conductors or leads 132, for example. Additionally, it will be appreciated that the height sensing devices can be of any suitable type, kind and/or construction, such as may operate using sound, pressure, light and/or electromagnetic waves, for example.

Having described an example of a suspension system (e.g., suspension system 100) that can include a gas spring and damper assembly in accordance with the subject matter of the present disclosure (e.g., gas spring and damper assembly 102), one example of such a gas spring and damper assembly will now be described in connection with FIGS. 2-6. As shown therein, one example of a gas spring and damper assembly 200, such as may be suitable for use as a gas spring and damper assembly 102 in FIG. 1, for example, is shown as including a damper assembly 202 and a gas spring assembly 204 that is operatively connected with the damper assembly. It will be appreciated that, in use, gas spring and damper assembly 200 can undergo changes in length (i.e., can be displaced between extended and collapsed conditions) as a suspension system within which one or more assemblies are installed dynamically moves to accommodate forces and/or inputs acting on the vehicle.

Gas spring and damper assembly 200 is shown in FIGS. 2-5 as having a longitudinally-extending axis AX with damper assembly 202 and gas spring assembly 204 operatively secured to one another around and along axis AX. Damper assembly 202 is shown in FIGS. 2-5 as extending along axis AX and including a damper housing 206 and a damper rod assembly 208 that is at least partially received in the damper housing. As identified in FIG. 2, damper housing 206 extends axially between opposing housing ends 210 and 212, and includes a housing wall 214 that at least partially defines a damping chamber 216. Damper rod assembly 208 extends lengthwise between opposing ends 218 and 220 and includes an elongated damper rod 222 and a damper piston 224 disposed along end 220 of damper rod assembly 208. Damper piston 224 is received within damping chamber 216 of damper housing 206 for reciprocal movement along the housing wall in a conventional manner. A quantity of damping fluid (not shown) can be disposed within damping chamber and damper piston 224 can be displaced through the damping fluid to dissipate kinetic energy acting on gas spring and damper assembly 200. Though damper assembly 202 is shown and described herein as having a conventional construction in which a hydraulic fluid is contained within at least a portion of damping chamber 216, it will be recognized and appreciated that dampers of other types, kinds and/or constructions, such as pressurized gas or "air" dampers, for example, could be used without departing from the subject matter of the present disclosure.

Housing wall 214 can form an opening (not shown) along housing end 210. A damper end wall 226 (FIG. 2) can extend across the opening and can be secured on or along housing wall 214 such that a substantially fluid-tight connection is formed therebetween. Damper end wall 226 can include an opening (not shown) and elongated rod 222 can extend axially-outwardly from damping chamber 212 through the opening in a direction opposite housing end 212. Additionally, a damper end wall 228 can be connected across end 212 of damper housing 206 such that a substantially fluid-tight connection is formed therebetween.

Elongated rod 222 projects outwardly from damper end wall 226 such that end 218 of the elongated rod is outwardly exposed from the damper housing and is externally accessible with respect to the damper housing. A connection feature 230, such as a plurality of threads, for example, can be provided on or along the elongated rod for use in operatively connecting gas spring and damper assembly 200 to an associated vehicle structure, a component of gas spring assembly 204 or another component of gas spring and damper assembly 200, such as is shown in FIGS. 2-5, for example.

Figure 2:
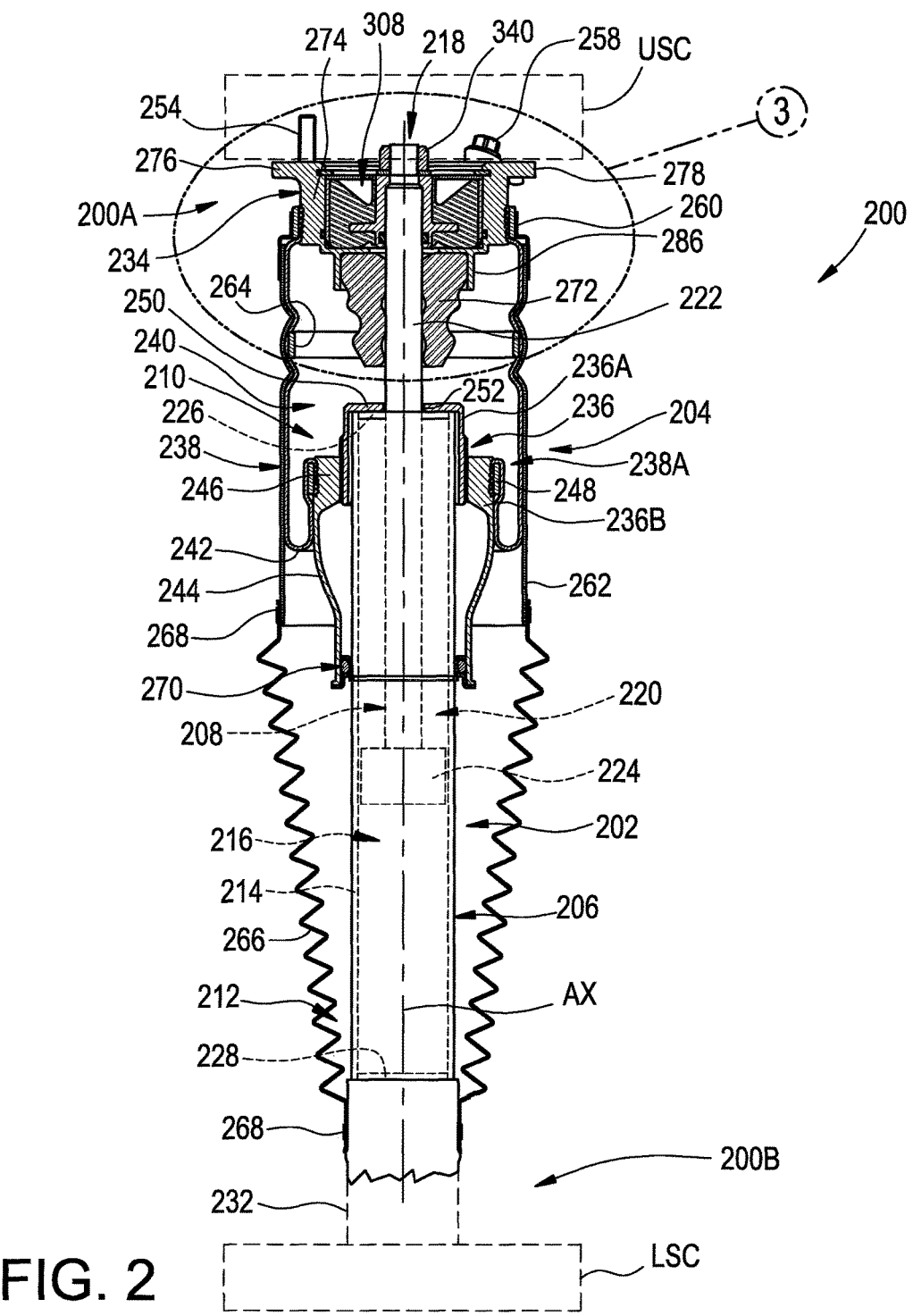
FIG. 2 is a side elevation view, in partial cross-section, of one example of a gas spring and damper assembly in accordance with the subject matter of the present disclosure.
Figure 3:
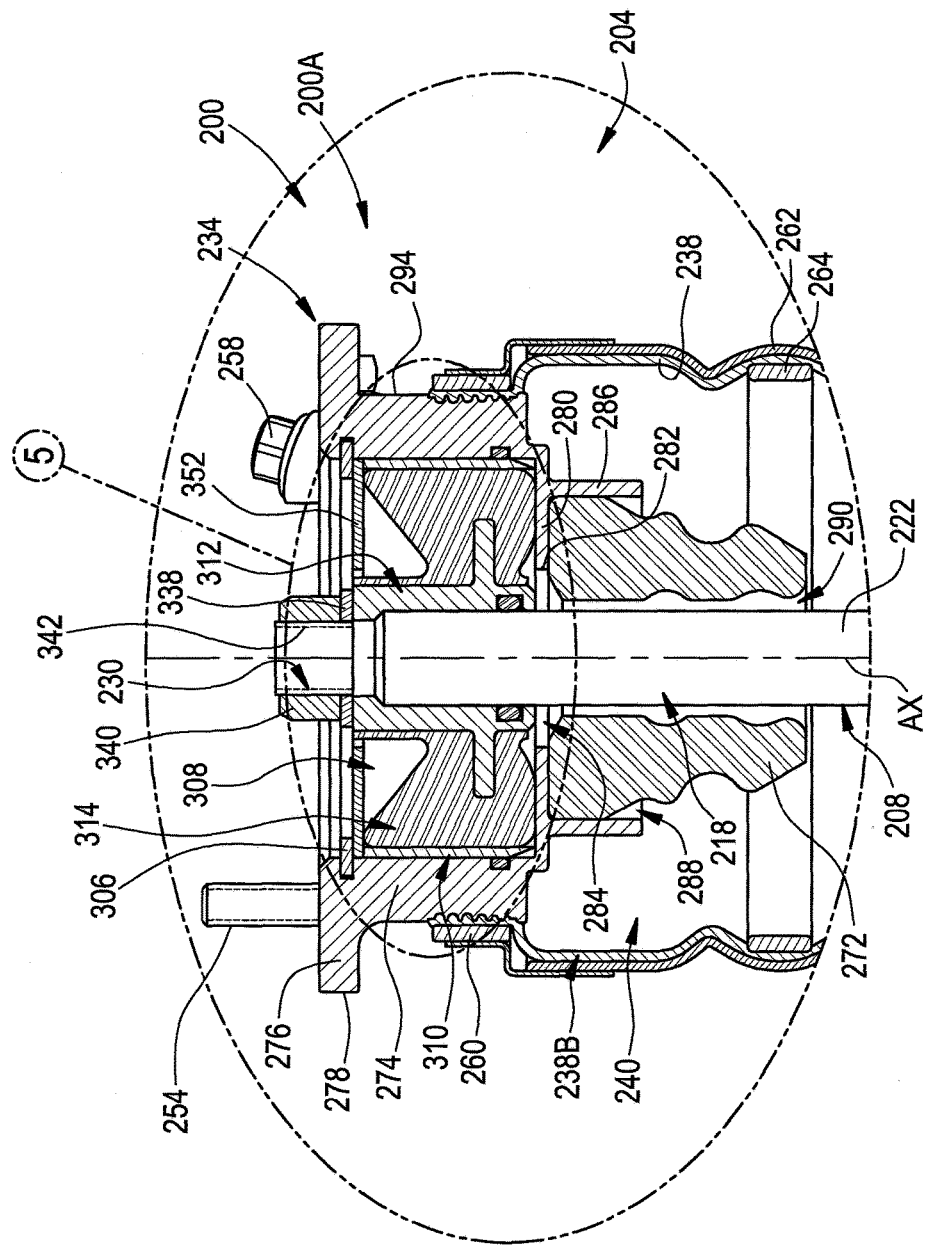
FIG. 3 is an enlarged cross-sectional view of the portion of the gas spring and damper assembly identified in Detail 3 of FIG. 2.
Figure 4:
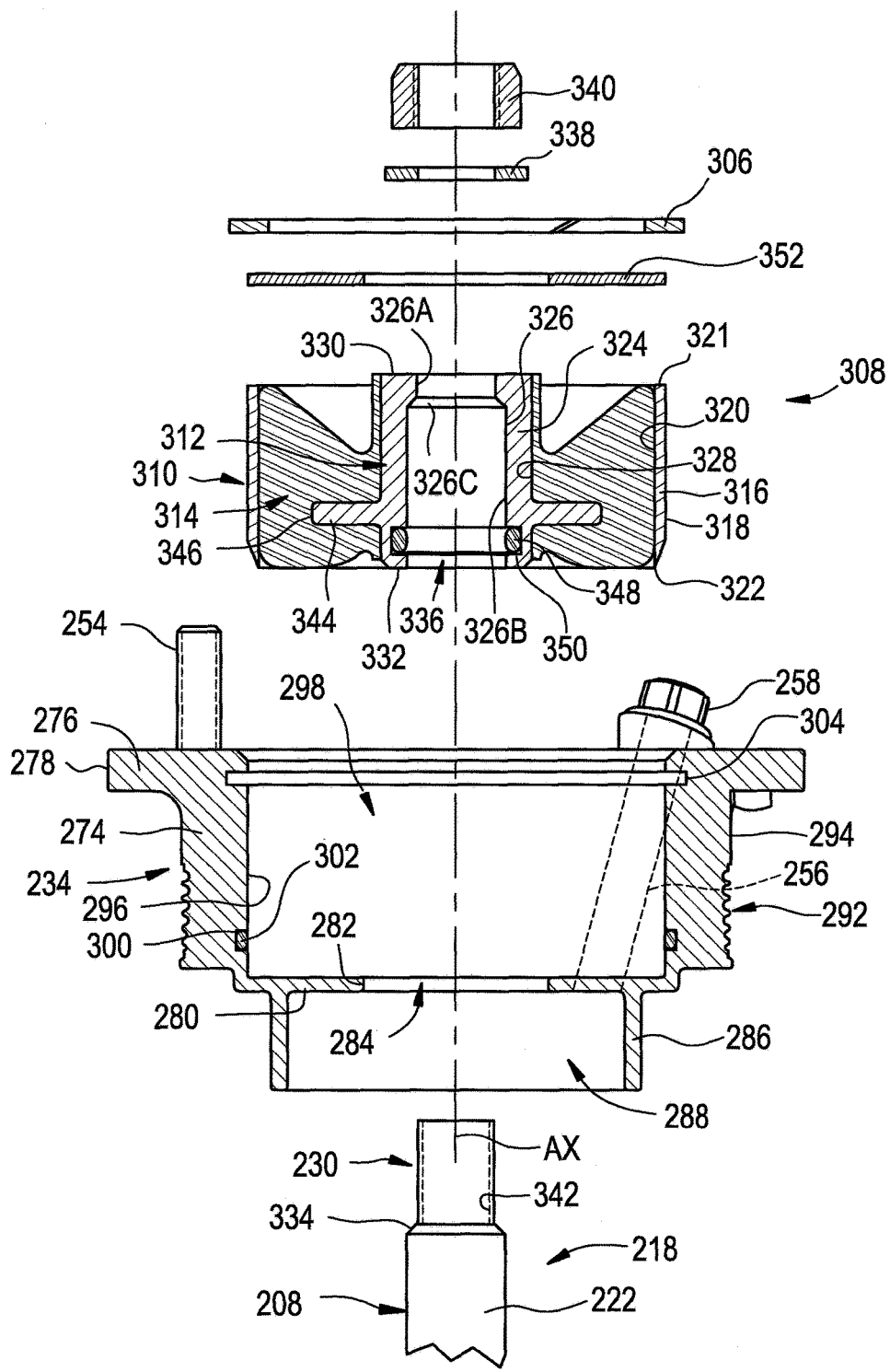
FIG. 4 is an exploded view of the portion of the gas spring and damper assembly in FIG. 3.
Figure 5:
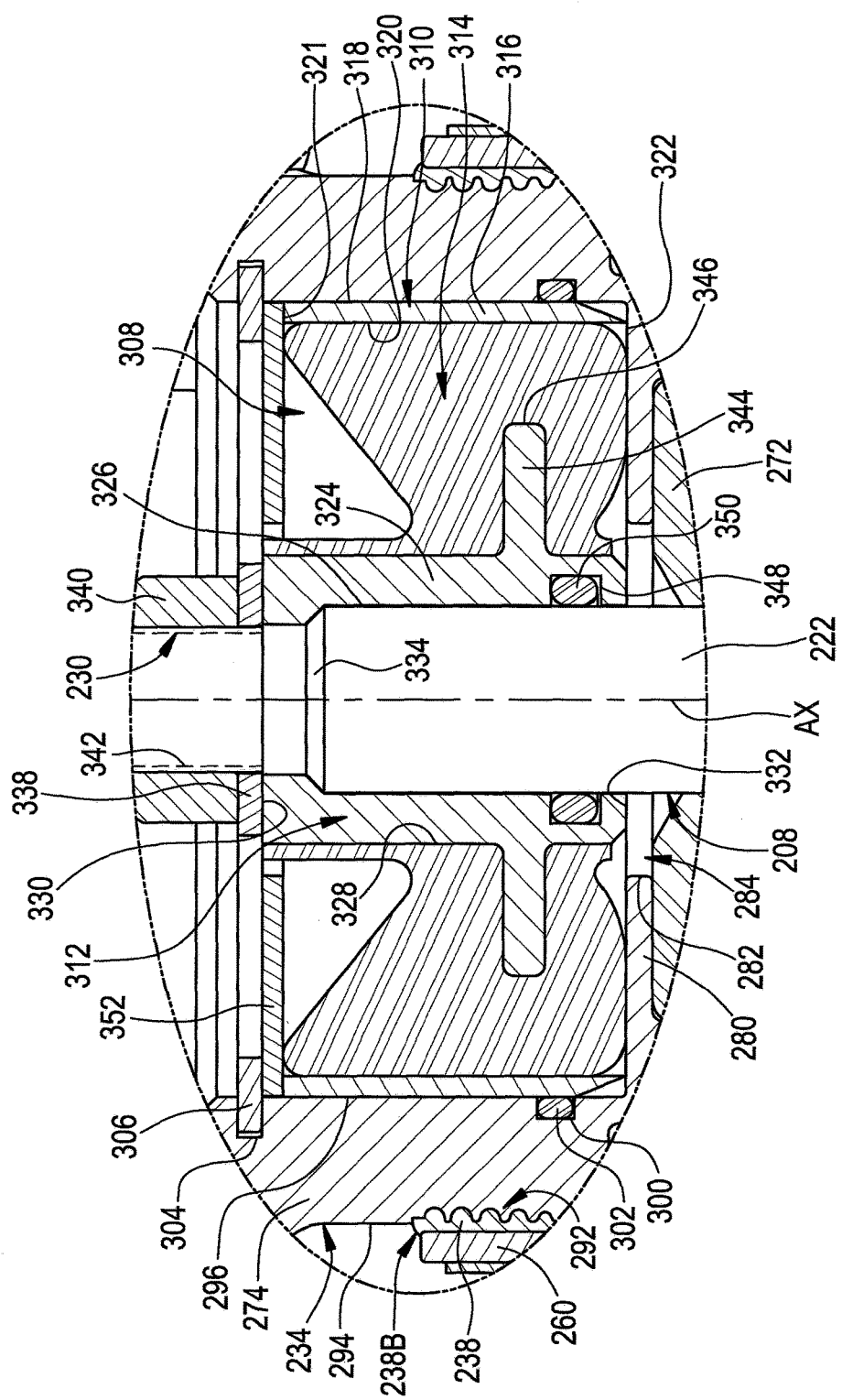
FIG. 5 is a more enlarged cross-sectional view of a portion of the gas spring and damper assembly in FIGS. 2-4, as identified in Detail 5 of FIG. 3, illustrating one example of a damper rod bushing in accordance with the subject matter of the present disclosure.

It will be appreciated that gas spring and damper assembly 200 can be operatively connected between associated sprung and unsprung masses of an associated vehicle (or other construction) in any suitable manner. For example, one end of the assembly can be operatively connected to the associated sprung mass with the other end of the assembly disposed toward and operatively connected to the associated unsprung mass. As shown in FIG. 2, for example, a first or upper end 200A of assembly 200 can be secured on or along a first or upper structural component USC, such as associated vehicle body BDY in FIG. 1, for example, and can be secured thereon in any suitable manner. A second or lower end 200B of assembly 200 can be secured on or along a second or lower structural component LSC, such as associated vehicle body BDY in FIG. 1, for example, and can be secured thereon in any suitable manner. For example, damper assembly 202 can be operatively connected to lower structural component LSC and can be secured thereto in any suitable manner. In some cases, damper assembly 202 can include a connection feature 232, such as a pivot or bearing mount (not shown), for example, that is operatively disposed along damper housing 206 and is adapted for securement to lower structural component LSC in a suitable manner.

Gas spring assembly 204 includes an end member 234, such as a top cap, bead plate or reservoir enclosure, for example. Gas spring assembly 204 also includes an end member 236, such as a roll-off piston or piston assembly, for example, that is disposed in axially-spaced relation to end member 234. A flexible spring member, such as an elongated flexible wall or sleeve 238, for example, can be operatively connected between end members 234 and 236 in a substantially fluid-tight manner such that a spring chamber 240 is at least partially defined therebetween. In some cases, flexible sleeve 238 can form a rolling lobe 242 that is displaced along an outer surface 244 of end member 236 as gas spring and damper assembly 200 moves between extended and compressed conditions.

As shown in FIG. 2, end member 236 can be formed from one or more component parts, such as an end cap 236A and an outer sleeve 236B, for example. Regardless of the type of construction used, end member 236 can include a wall portion 246 along which one end 238A of flexible sleeve 238 is operatively connected, such as, for example, through the use of a retaining ring 248 that can be crimped radially inward or otherwise deformed to form a substantially fluid-tight connection therebetween. End member 236 can also include a wall portion 250 that projects radially inward from wall portion 246. In some cases, end member 236 can be fit over or otherwise receive at least a portion of damper housing 206 such that wall portion 250 engages end wall 226 of the damper housing, such as to support the end member on the damper housing. A passage wall 252 can at least partially define a passage (not numbered) that extends through end member 236 and is dimensioned to permit elongated rod 222 to pass therethrough. In such cases, elongated rod 222 can slidably translate into and out of the gas spring assembly through end member 236.

As discussed above, gas spring and damper assembly 200 can be operatively connected between associated sprung and unsprung masses of an associated vehicle (or other structure) in any suitable manner. As shown in FIG. 2, for example, second end 200A of assembly 200 can be secured on or along upper structural component USC in any suitable manner. As one example, one or more securement devices, such as mounting studs 254, for example, can be included along end member 234. In some cases, the one or more securement devices (e.g., mounting studs 254) can project outwardly from end member 234 and can be secured thereon in a suitable manner, such as, for example, by way of a flowed-material joint (not shown) or a press-fit connection (not identified). Additionally, such one or more securement devices can extend through mounting holes (not shown) in upper structural component USC and can receive one or more threaded nuts (not shown) or other securement devices, for example. Additionally, or as an alternative to one or more of mounting studs 254, one or more threaded passages (e.g., blind passages and/or through passages) could be used in conjunction with a corresponding number of one or more threaded fasteners.

A fluid communication port can optionally be provided to permit fluid communication with spring chamber 240, such as may be used for transferring pressurized gas into and/or out of the spring chamber, for example. It will be appreciated that such a fluid communication port can be provided in any suitable manner. As one example, a fluid communication port could extend through one or more of mounting studs 254. As another example, end member 234 can include a transfer passage 256 extending therethrough that is in fluid communication with spring chamber 240. It will be appreciated, however, that any other suitable fluid communication arrangement could alternately be used. In some cases, passage 256 can be adapted to receive a suitable connector fitting 258, such as may be suitable for operatively connecting gas transfer lines 122 (FIG. 1) to the gas spring and damper assembly.

An opposing end 238B of flexible sleeve 238 can be secured on or along end member 234 in any suitable manner. As one example, a portion of the flexible sleeve can be secured in abutting engagement along a wall portion of end member 234 by way of a retaining ring 260 that can be crimped radially inward or otherwise deformed to form a substantially fluid-tight connection therebetween. Additionally, gas spring and damper assembly 200 can, optionally, include an external sleeve or support, such as a restraining cylinder 262, for example, that can be secured on or along the flexible sleeve in any suitable manner. As one example, a portion of the flexible sleeve can be secured in abutting engagement along a wall portion of restraining cylinder 262 by way of a retaining ring 264 that can be crimped radially outward or otherwise deformed to form engagement between the restraining cylinder and the flexible sleeve. It will be appreciated, however, that other arrangements could alternately be used.

Gas spring and damper assembly 200 can also, optionally, include one or more additional components and/or features. For example, an accordion-type bellows 266 can extend along at least a portion of the gas spring and damper assembly and can be secured to one or more components thereof in any suitable manner, such as by way of retaining rings 268, for example. As another example, a seal assembly 270 can be disposed in fluid communication between damper housing 206 and end member 236, such that a substantially fluid-tight seal can be formed therebetween. As a further example, a jounce bumper 272 can be disposed within spring chamber 240 and can be supported on or along one of end members 234 and 236 in a suitable manner. In the arrangement shown in FIGS. 2-5, jounce bumper 272 is received along elongated rod 222 and supported on end member 234. It will be appreciated, however, that other configurations and/or arrangements could alternately be used.

It will be appreciated that end member 234 can be formed from any suitable material or combination of materials, and can include any suitable number or combination of one or more walls and/or wall portions. In the arrangement shown in FIGS. 2-5, for example, end member 234 includes an outer side wall portion 274 that extends in a generally axial direction with an outer flange wall portion 276 disposed toward one end of the outer side wall portion and extending radially outward from the outer side wall portion toward an outer peripheral edge 278. An end wall portion 280 can be disposed in spaced relation to outer flange wall portion 276 in a direction toward the other end of outer side wall portion 274. End wall portion 280 can extend radially inward from the outer side wall portion toward an inner peripheral edge 282 that at least partially defines a passage or opening 284 through end member 234. In a preferred arrangement, opening 284 is dimensioned to receive elongated rod 222 therethrough for operative connection with end member 234 as discussed below.

An inner side wall portion 286 can project from end wall portion 280 in a direction away from outer flange wall portion 276 to at least partially define a recess or cavity 288 (FIG. 4) dimensioned to receive at least a portion of jounce bumper 272, if included, which can be secured on or along the end member in any suitable manner, such as by way of a press-fit connection with the inner side wall portion, for example. Additionally, in such cases, an opening, gap or other clearance 290 (FIG. 3) can be maintained between elongated rod 222 and an inner surface of jounce bumper 272. In some cases, one or more additional features can also be provided on or along end member 234. As one example, a plurality of securement features 292 (FIG. 4), such as a plurality of endless annular grooves having progressively variable depths, for example, can be provided on or along an outside surface 294 of outer side wall portion 274, such as may be suitable for engaging a portion of flexible wall 238, for example, can extend at least partially along the outer side wall portion.

Additionally, outer side wall portion 274 has an inside surface 296 opposite outside surface 294. Inside surface 296 together with end wall portion 280 can at least partially define a cavity or chamber 298 disposed along end wall portion 280 opposite cavity 288. Cavity 298 can have an open end (not numbered) facing toward outer flange wall portion 276. An annular groove 300 can extend radially into outer side wall portion 274 from along inside surface 296 and can be dimensioned to receive a sealing element 302, such as an O-ring, for example. Additionally, or in the alternative, an annular groove 304 can extend radially into outer side wall portion 274 from along inside surface 296 and can be dimensioned to at least partially receive a retaining ring 306 or other suitable securement device, for example.

Gas spring and damper assembly 200 can also include a damper rod bushing 308, which may be alternately referred to herein as an elastomeric bushing assembly, that is operatively connected between elongated rod 222 of damper assembly 202 and end member 234 of gas spring assembly 204. In this manner, forces acting on one of damper rod 222 and end member 234 that are experienced during use of the gas spring and damper assembly are transmitted or otherwise communicated through damper rod bushing 308 to the other of damper rod 222 and end member 234. What's more, damper rod bushing 308 is constructed to provide desired performance and operating characteristics while experiencing direct exposure to pressurized gas from spring chamber 240. That is, a damper rod bushing in accordance with the subject matter of the present disclosure, such as damper rod bushing 308, for example, is configured to provide desired performance and operating characteristics while experiencing pre-load forces associated with exposure to the pressurized gas within the spring chamber of the gas spring assembly. In this respect, damper rod bushings in accordance with the subject matter of the present disclosure differ from conventional constructions, which are typically constructed for use with a seal assembly interposed between the damper rod bushing and the spring chamber to fluidically isolate the damper rod bushing from such pre-load forces. In some cases, a damper rod bushing having a conventional construction that is used with such a seal assembly will have surfaces or sides facing axially-outward and axially-inward that are both fluidically isolated from the spring chamber and in fluid communication with an external atmosphere.

Damper rod bushing 308 is shown in FIGS. 2-6 as including an outer support element 310, which may sometimes be referred to in the art as an outer metal, and an inner support element 312, which may sometimes be referred to in the art as an inner metal. Damper rod bushing 308 also includes an elastomeric connector element 314 that is permanently attached (i.e., inseparable without damage, destruction or material alteration of at least one of the component parts) between outer and inner support elements 310 and 312. Additionally, in such a construction, elastomeric connector element 314 forms a substantially fluid-tight seal between outer and inner support elements 310 and 312. It will be appreciated that such substantially fluid-tight joints or connections can be formed by way of one or more processes and/or can include the use of one or more treatments and/or materials. Non-limiting examples of suitable processes can include molding, adhering, curing and/or vulcanizing.

Outer support element 310 can include an element wall 316 that can be formed from a comparatively rigid material with respect to the material of elastomeric connector element 314. Element wall 316 can have an outside surface 318 dimensioned for receipt within cavity 298 and an inside surface 320 to which elastomeric connector element 314 can be permanently attached. Element wall 316 can extend in a generally axial direction between a first edge 321 and an opposing second edge 322. In some cases, one of the edges (e.g., second edge 322) can have a frustoconical or otherwise tapered surface, such as may promote assembly or provide other benefits or uses. In a preferred arrangement, outside surface 318 of element wall 316 can have an approximately cylindrical shape and can be dimensioned to form a light press-fit with inside surface 296 of outer side wall portion 274. It will be appreciated that outer support element 310 can be secured on or along end member 234 in any suitable manner. As one example, retaining ring 306 (or together with one or more another components) can, in an installed condition, be dimensioned to project radially outward from groove 304 along inside surface 296 of outer side wall portion 274 a distance sufficient to overlap at least a portion of the outer support element and thereby inhibit axial displacement of outer support element 310.

Inner support element 312 can include an element wall 324 that can be formed from a comparatively rigid material with respect to the material of elastomeric connector element 314. Element wall 324 can have an inside surface 326, an outside surface 328 and can extend axially between opposing first and second end surfaces or edges 330 and 332. It will be appreciated that inner support element 312 can be operatively attached to elongated rod 222 in any suitable manner. As one example, inside surface 326 can be dimensioned to receive a portion of elongated rod 222 such that the inner support element and the elongated rod can be secured together in a suitable manner. In the arrangement shown in FIGS. 2-6, inside surface 326 has a first surface portion 326A with a first cross-sectional dimension, a second surface portion 326B with a second cross-sectional dimension that is greater than the first cross-sectional dimension of the first surface portion such that a shoulder surface portion 326C extends between and connects first and second surface portions 326A and 326B.

Damper rod 222 can include a shoulder surface 334 dimensioned to cooperate with shoulder surface portion 326C. The damper rod can be received within a passage 336 formed through inner support element 312 by inside surface 326 such that shoulder surface portion 326C and shoulder surface 334 are in abutting engagement with one another. Inner support element 312 can be captured or otherwise secured on or along damper rod 222 by way of one or more securement features and/or components, such as a washer 338 and threaded nut 340, for example, engaging corresponding securement features on or along the damper rod, such as one or more helical threads 342, for example. In this manner, damper rod 222 and inner support element 312 can be secured to one another.

Inner support element 312 includes outside surface 328 to which to which elastomeric connector element 314 can be permanently attached. Additionally, inner support element include a flange wall portion 344 that project radially outward from outside surface 328 toward an outer peripheral edge 346. Flange wall portion 344 is disposed in spaced relation to each of end surfaces 330 and 332 such that elastomeric connector element 314 is permanently attached to portions of outside surface 328 along both sides of flange wall portion 344. As such, it will be recognized and appreciated that flange wall portion 344 is shown in the exemplary arrangement as being substantially-entirely embedded within elastomeric connector element 314.

As discussed above, the permanent attachment of elastomeric connector element 314 to outer and inner support elements 310 and 312 forms a substantially fluid-tight seal across damper rod bushing 308. In that the damper rod bushing is exposed during use to pressurized gas contained within spring chamber 240 of gas spring assembly 204, it may be desirable to inhibit or at least minimize or reduce pressurized gas loss around damper rod bushing 308. As such, sealing element 302 can form a substantially fluid-tight seal between end member 234 and outer support element 310. Additionally, inner support element 312 can include an annular groove 348 that can extend radially into element wall 324 from along inside surface 326 and can be dimensioned to receive a sealing element 350, such as an O-ring, for example. In such case, sealing element 350 can form a substantially fluid-tight seal between damper rod 222 and inner support element 312.

It has been determined that an elastomeric connector element having a combination of certain geometric features within certain ranges of relative scale with one another can result in a damper rod bushing that has predetermined and desirable performance and operating characteristics, in accordance with the subject matter of the present disclosure. One example of such performance and operating characteristics are graphically represented in FIG. 7 in which a Curve A represents deflection versus force for a damper rod bushing experiencing pre-load forces due to exposure to pressurized gas from a spring chamber having nominal gas pressure level substantially (e.g., at least 3 times) greater than standard atmospheric pressure.

Figure 7:
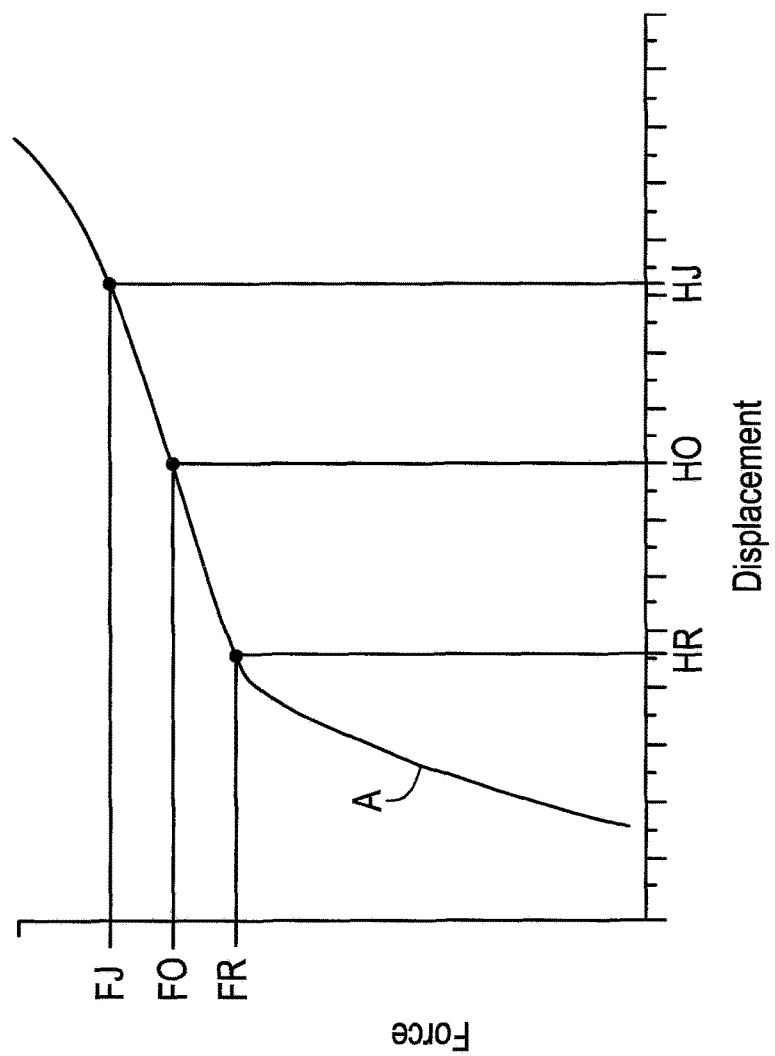
FIG. 7 is a graphical representation illustrating an approximate relationship of force and displacement associated with a damper rod bushing in accordance with the subject matter of the present disclosure.

In particular, Curve A illustrates performance of one example of an elastomeric bushing assembly (e.g., damper rod bushing 308) in connection with a corresponding gas spring and damper assembly (e.g., assembly 200) at a normal or design height HO. At such a height of the gas spring and damper assembly, the elastomeric bushing assembly can have a corresponding deflection force of F0. As the gas spring and damper assembly is displaced toward a compressed or jounce condition, a corresponding displacement is represented in FIG. 7 by height HJ that corresponds to a deflection force of FJ. As the gas spring and damper assembly is displaced toward an extended or rebound condition, a corresponding displacement is represented in FIG. 7 by height HR that corresponds to a deflection force of FR. It will be recognized and appreciated that a predetermined and desired characteristic of Curve A is that as the gas spring and damper assembly is displaced between the jounce condition represented by deflection HJ and the rebound condition represented by deflection HR, the change in deflection force is approximately linear along Curve A from deflection force FJ to deflection force FR.

During use in an installed condition of damper rod bushing 308, it will be appreciated that a portion of elastomeric connector element 314 will be disposed in abutting engagement with end wall portion 280 of end member 234. Additionally, it may be desirable to include a support wall along the end of the damper rod bushing opposite end wall portion 280. In such case, damper rod bushing 308 can, optionally, include an end plate or end wall portion 352 that can be supported or otherwise provided on or along one or more components of the damper rod bushing in any suitable manner. It will be appreciated that end plate 352 can be formed from one or more portions of an existing component (e.g., outer support element 310) or provided as a separate component, such as is shown in FIGS. 2-5, for example.

Elastomeric connector element 314 can be formed from any suitable material or combination of materials capable of providing or contributing to the desired performance and/or operating characteristics of the corresponding elastomeric bushing assembly. Examples of suitable materials can include rubber, such as natural and/or synthetic rubber, for example, and thermoplastic elastomers, such as polyurethane, for example. In one exemplary arrangement, elastomeric connector element 314 can be formed from one or more masses (e.g., a single monolithic mass, or one or more layers or body segments) of uncured rubber. The one or more masses of uncured rubber can then be vulcanized or otherwise cured to form a single, unitary body. It will be appreciated, however, that the foregoing construction is merely exemplary and that any other suitable process or combination of operations for manufacturing such a construction could alternately be used.

Figure 6:
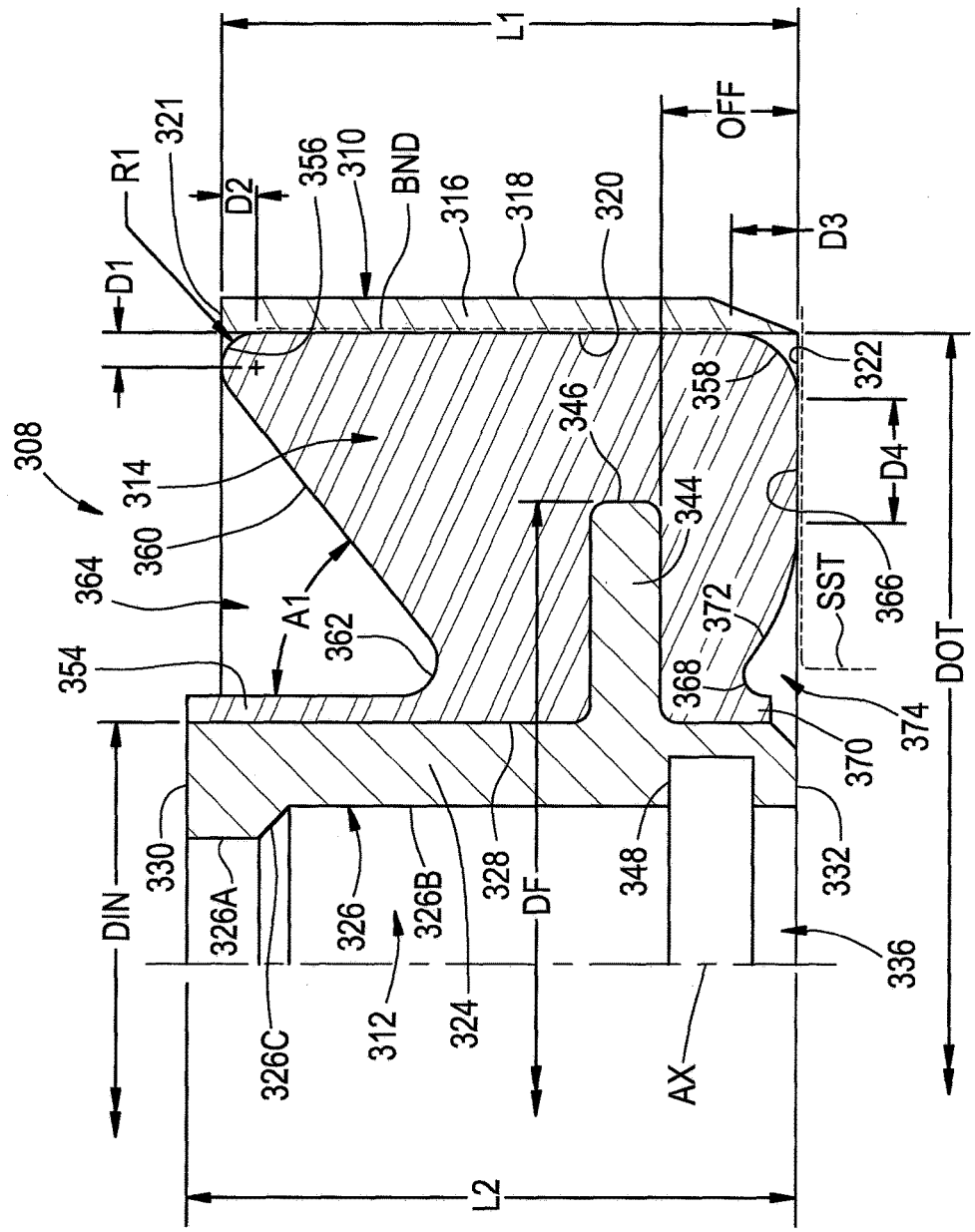
FIG. 6 is a further enlarged cross-sectional view of the damper rod bushing in FIGS. 2-5 shown in additional detail.

As identified in FIG. 6, elastomeric connector element 314 is shown as including a central wall extension 354 extending along outside surface 328 from adjacent first end surface 330 in a direction toward second end surface 332. Elastomeric connector element 314 also includes a first outer edge 356 disposed adjacent inside surface 320 along one end of outer support element 310, and a second outer edge 358 disposed adjacent inside surface 320 along the other end of outer support element 310. Elastomeric connector element 314 is shown as further including a tapered or frustoconical surface 360 that extends inwardly from along first outer edge 356 toward an end of central wall extension 354 such that surface 360 and extension 354 can intersect with one another at a root radius 362.

Central wall extension 354, surface 360 and radius 362 can together at least partially define an annular recess 364 extending axially into elastomeric connector element 314. Additionally, elastomeric connector element 314 can include a base surface 366 extending inward from along second outer edge 358 toward a root radius 368 adjacent a central wall extension 370 extending along outside surface 328 from adjacent second end surface 332 in a direction toward first end surface 330. A contoured surface 372 can extend between and operatively connect base surface 366 and root radius 368. Contoured surface 372 together with root radius 368 and central wall extension 370 can at least partially define an annular recess 374 extending into elastomeric connector element 314 generally opposite recess 364.

As mentioned above, it has been determined that a combination of certain geometric features within certain ranges of relative scale with one another can result in a damper rod bushing that has predetermined and desirable performance and operating characteristics, in accordance with the subject matter of the present disclosure. One example of a combination of geometric features that can result in such a construction is identified in FIG. 6, which includes numerous independent features as well as numerous dependent features.

One example of an independent feature is an outside cross-sectional dimension of elastomeric connector element 314, as is represented by reference dimension DOT. It will be appreciated that a value within any suitable range of dimensions can be used, such as a value within a range of from about one (1) inch to about six (6) inches, for example.

Another example of an independent feature is an inside cross-sectional dimension of elastomeric connector element 314, as is represented by reference dimension DIN. It will be appreciated that a value within any suitable range of dimensions can be used, such as a value within a range of from about one-half (½) inch to about four (4) inches, for example.

A further example of an independent feature is a length from an outermost axial extent of first outer edge 356 to base surface 366, as is represented by reference dimension L1. It will be appreciated that a value within any suitable range of dimensions can be used, such as a value within a range of from about one-half (½) inch to about four (4) inches, for example.

Still a further example of an independent feature is a length from an end of central wall extension 354 adjacent first end surface 330 to base surface 366, as is represented by reference dimension L2 in FIG. 6. It will be appreciated that a value within any suitable range of dimensions can be used, such as a value within a range of from about one-half (½) inch to about four (4) inches, for example.

Still another example of an independent feature is an included angle A1 relative to axis AX and/or central wall extension 354. It will be appreciated that an angle within a range of from about 45 to about 60 degrees may be used in conjunction with one or more of the independent and dependent features described herein to construct a damper rod bushing in accordance with the subject matter of the present disclosure.

Additionally, various dependent features are identified in FIG. 6 by reference dimensions listed in Table T1, shown below. It will be appreciated that for a given independent feature and corresponding independent dimension of the independent feature, the size and/or length of the following dependent features can be determined based on the range provided in Table T1. It is generally preferred to determine most, if not all, of the dependent dimensions using a single, selected independent dimension.

TABLE T1

|  |  | Independent Dimensions | | | |
|---|---|---|---|---|---|
|  |  | DOT | DIN | L1 | L2 |
| Depen- | DF | 110-180% | 40-70% | 50-85% | 55-90% |
| dent | OFF | 850-1050% | 325-400% | 390-475% | 410-510% |
| Dimen- | R1 | 2500-5850% | 975-2225% | 1150-2675% | 1225-2825% |
| sions | D1 | 2500-5850% | 975-2225% | 1150-2675% | 1225-2825% |
|  | D2 | 2500-5850% | 975-2225% | 1150-2675% | 1225-2825% |
|  | D3 | 1450-3650% | 610-900% | 725-1075% | 775-1150% |
|  | D4 | 850-1200% | 325-475% | 400-575% | 425-590% |

With further reference to the various dependent features and corresponding reference dimensions listed above, reference dimension DF corresponds to a cross-sectional size (e.g., diameter) of flange wall portion 344. Reference dimension OFF corresponds to an offset dimension of flange wall portion 344 from base surface 366. Reference dimension R1 corresponds to a radius or size of first outer edge 356. Reference dimension D1 corresponds to a distance of a centerpoint of first outer edge 356 to inside surface 320 of outer support element 310. Reference dimension D2 corresponds to a distance from an outermost axial extent of first outer edge 356 to the initial point at which elastomeric connector element 314 is bonded to inside surface 320 of outer support element 310, which bonding or joint is represented by dashed line BND in FIG. 6. Reference dimension D3 corresponds to a distance from an outermost axial extent of second outer edge 358 and/or base surface 366 to the initial point at which elastomeric connector element 314 is bonded to inside surface 320 of outer support element 310, which bonding or joint is represented by dashed line BND in FIG. 6. Reference dimension D4 corresponds to a distance that base surface 366 extends in abutting engagement along a support structure (e.g., end wall portion 280), as is represented by dashed line SST in FIG. 6.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:
1. A gas spring and damper assembly comprising:
   a gas spring having a longitudinal axis and including:
      a first end member;

a second end member spaced axially from said first end member; and, a flexible spring member extending peripherally about said longitudinal axis between opposing first and second ends, said first end secured on said first end member such that a substantially fluid-tight seal is formed therebetween and said second end secured on said second end member such that a substantially fluid-tight seal is formed therebetween with a spring chamber at least partially defined by said flexible spring member and said first and second end members;

a damper extending longitudinally between and operatively connecting said first and second end members such that at least a portion of said damper extends through said spring chamber, said damper including:
  a damper housing operatively connected to said first end member and including a housing wall that at least partially defines a damping chamber; and,
  a damper rod assembly including a damper rod and a damper piston, said damper rod extending axially between a first end and a second end, said damper piston operatively secured to said second end of said damper rod;
  said damper rod assembly operatively engaged with said damper housing such that said damper piston is disposed within said damping chamber with at least said first end of said damper rod projecting outwardly from said damper housing and such that said damper rod assembly and damper housing can undergo reciprocal motion relative to one another; and, a damper rod bushing operatively connecting said second end member of said gas spring and said first end of said damper rod assembly of said damper with at least a portion of said damper rod bushing disposed in fluid communication with said spring chamber such that pre-load forces due to gas pressure within said spring chamber act on said damper rod bushing, said damper rod bushing extending axially between a first end and a second end, said damper rod bushing including:
  an outer support element including an inner surface;
  an inner support element extending between opposing first and second end surfaces and including an outer surface, an inner surface at least partially defining a passage through said inner support element that is dimensioned to receivingly engage said first end of said damper rod, and a flange wall portion projecting radially outward beyond said outer surface to an outer peripheral edge, said flange wall portion including a first side surface disposed toward said first end surface and a second side surface disposed toward said second end surface, said flange wall portion having a flange cross-sectional dimension (DF) across said outer peripheral edge, and said flange wall portion disposed in spaced relation to said opposing first and second end surfaces such that at least said second side surface is axially offset from said second end surface by a flange offset dimension (OFF); and,
  an elastomeric connector element operatively connected between said inner support element and said inner surface of said outer support element such that a substantially fluid-tight seal is formed therebetween, said elastomeric connector element being permanently attached along an annular joint extending axially in cross-sectional profile between a first attachment point disposed toward said first end of said damper rod bushing and a second attachment point disposed toward said second end of said damper rod bushing, said elastomeric connector element including:
    a first outer edge disposed along said outer support element toward said first end of said elastomeric bushing element, said first outer edge including a cross-sectional profile with a radius of curvature (R1) and defining an outermost axial extent of said first outer edge, said radius of curvature having a centerpoint spaced inward from said inner surface of said outer support element by a radius offset dimension (D1), said outermost axial extent of said first outer edge being axially offset from said first attachment point by an first unsecured edge dimension (D2);
    a second outer edge disposed along said outer support element toward said second end of said elastomeric bushing element, said second outer edge including an outermost axial extent axially offset from said second attachment point by a second unsecured edge dimension (D3); and,
    a base surface extending radially inward from along said second outer edge in abutting engagement along said first end member such that said base surface has a cross-sectional profile with a base surface engagement dimension (D4).

2. A gas spring and damper assembly according to claim 1, wherein said elastomeric connector element include a connector element wall that is at least partially formed from an elastomeric material selected from the group consisting of natural rubber, synthetic rubber and thermoplastic elastomer.

3. A gas spring and damper assembly according to claim 1, wherein said outer support element includes an inner surface to which said elastomeric connector element is permanently attached and an outer surface dimensioned for receipt in abutting engagement with said second end member.

4. A gas spring and damper assembly according to claim 1, wherein said elastomeric connector element includes:
  a first central wall extension disposed along said inner support element toward said first end of said elastomeric bushing element;
  a second central wall extension disposed along said inner support element toward said second end of said elastomeric bushing element and in axially-spaced relation to said first central wall extension;
  a first recess surface disposed between said first central wall extension and said first outer edge along said first end of said elastomeric bushing element, said first recess surface at least partially defining an annular recess extending into said elastomeric connector element from along said first end of said elastomeric bushing element; and,
  a second recess surface disposed between said second central wall extension and said second outer edge along said second end of said elastomeric bushing element, said second recess surface at least partially defining an annular recess extending into said elastomeric connector element from along said second end of said elastomeric bushing element.

5. A gas spring and damper assembly according to claim 1, wherein said elastomeric connector element has an outside cross-sectional dimension (DOT), said flange cross-sectional dimension (DF) is within a range of approximately 110 percent to approximately 180 percent of said outside cross-sectional dimension; said flange offset dimension (OFF) is within a range of approximately 850 percent to approximately 1050 percent of said outside cross-sectional dimension, said radius of curvature (R1) is within a range of approximately 2500 percent to approximately 5850 percent of said outside cross-sectional dimension, said radius offset dimension (D1) is within a range of approximately 2500 percent to approximately 5850 percent of said outside cross-sectional dimension, said first unsecured edge dimension (D2) is within a range of approximately 2500 percent to approximately 5850 percent of said outside cross-sectional dimension, said second unsecured edge dimension (D3) is within a range of approximately 1450 percent to approximately 3650 percent of said outside cross-sectional dimension, and said base surface engagement dimension (D4) is within a range of approximately 850 percent to approximately 1200 percent of said outside cross-sectional dimension.

6. A gas spring and damper assembly according to claim 1, wherein said elastomeric connector element has an inside cross-sectional dimension (DIN), said flange cross-sectional dimension (DF) is within a range of approximately 40 percent to approximately 40 percent of said inside cross-sectional dimension, said flange offset dimension (OFF) is within a range of approximately 325 percent to approximately 400 percent of said inside cross-sectional dimension, said radius of curvature (R1) is within a range of approximately 975 percent to approximately 2225 percent of said inside cross-sectional dimension, said radius offset dimension (D1) is within a range of approximately 975 percent to approximately 2225 percent of said inside cross-sectional dimension, said first unsecured edge dimension (D2) is within a range of approximately 975 percent to approximately 2225 percent of said inside cross-sectional dimension, said second unsecured edge dimension (D3) is within a range of approximately 610 percent to approximately 900 percent of said inside cross-sectional dimension, and said base surface engagement dimension (D4) is within a range of approximately 325 percent to approximately 475 percent of said inside cross-sectional dimension.

7. A gas spring and damper assembly according to claim 1, wherein said elastomeric connector element has an axially-extending length (L1) extending between said outermost axial extent of said first outer edge and said base surface, said flange cross-sectional dimension (DF) is within a range of approximately 50 percent to approximately 85 percent of said axially-extending length, said flange offset dimension (OFF) is within a range of approximately 390 percent to approximately 475 percent of said axially-extending length, said radius of curvature (R1) is within a range of approximately 1150 percent to approximately 2675 percent of said axially-extending length, said radius offset dimension (D1) is within a range of approximately 1150 percent to approximately 2675 percent of said axially-extending length, said first unsecured edge dimension (D2) is within a range of approximately 1150 percent to approximately 2675 percent of said axially-extending length, said second unsecured edge dimension (D3) is within a range of approximately 725 percent to approximately 1075 percent of said axially-extending length, and said base surface engagement dimension (D4) is within a range of approximately 400 percent to approximately 575 percent of said axially-extending length.

8. A gas spring and damper assembly according to claim 1, wherein said elastomeric connector element includes a first central wall extension disposed along said inner support element, said first central wall extension extending from a first end surface disposed along said first end of said elastomeric bushing element toward said first side surface of said flange wall portion of said inner support element, and said elastomeric connector element has an axially-extending length (L2) extending between said first end surface of said first central wall extension and said base surface, said flange cross-sectional dimension (DF) is within a range of approximately 50 percent to approximately 85 percent of said axially-extending length, said flange offset dimension (OFF) is within a range of approximately 390 percent to approximately 475 percent of said axially-extending length, said radius of curvature (R1) is within a range of approximately 1150 percent to approximately 2675 percent of said axially-extending length, said radius offset dimension (D1) is within a range of approximately 1150 percent to approximately 2675 percent of said axially-extending length, said first unsecured edge dimension (D2) is within a range of approximately 1150 percent to approximately 2675 percent of said axially-extending length, said second unsecured edge dimension (D3) is within a range of approximately 725 percent to approximately 1075 percent of said axially-extending length, and said base surface engagement dimension (D4) is within a range of approximately 400 percent to approximately 575 percent of said axially-extending length.

9. A damper rod bushing dimensioned to operatively connect an associated end member of an associated gas spring and an associated damper rod of an associated damper, said damper rod bushing comprising:
  a first end and a second end such that a longitudinal axis extends therebetween;
  an outer support element including an outer element wall with an inner surface and an outer surface dimensioned for receipt in abutting engagement with the associated end member;
  an inner support element including an inner element wall with an outer surface and an inner surface at least partially defining a passage through said inner support element that is dimensioned to receivingly engage the associated damper rod, said inner support element extending between opposing end surfaces and including a flange wall portion projecting radially outward beyond said outer surface to an outer peripheral edge, said flange wall portion including a first side surface disposed toward said first end surface and a second side surface disposed toward said second end surface, said flange wall portion having a flange cross-sectional dimension (DF) across said outer peripheral edge, and said flange wall portion disposed in spaced relation to said opposing end surfaces at least said second side surface is axially offset from said second end surface by a flange offset dimension (OFF); and,
  an elastomeric connector element extending between said outer support element and said inner support element, said elastomeric connector element permanently attached to said inner surface of said outer support element along an annular joint extending axially in cross-sectional profile between a first attachment point disposed toward said first end of said damper rod bushing and a second attachment point disposed toward said second end of said elastomeric bushing assembly, said elastomeric connector element permanently attached to at least a portion of said outer surface of said inner support element such that a substantially fluid-tight seal is formed therebetween, said elastomeric connector element including:

a first outer edge disposed along said outer support element toward said first end of said elastomeric bushing element, said first outer edge including a cross-sectional profile with a radius of curvature (R1) and defining an outermost axial extent of said first outer edge, said radius of curvature having a centerpoint spaced inward from said inner surface of said outer support element by a radius offset dimension (D1), said outermost axial extent of said first outer edge being axially offset from said first attachment point by an first unsecured edge dimension (D2);

a second outer edge disposed along said outer support element toward said second end of said elastomeric bushing element, said second outer edge including an outermost axial extent axially offset from said second attachment point by a second unsecured edge dimension (D3); and, a base surface extending radially inward from along said second outer edge in abutting engagement along said first end member such that said base surface has a cross-sectional profile with a base surface engagement dimension (D4).

10. An elastomeric connector element according to claim 9 further comprising:

a first central wall extension disposed along said inner support element toward said first end of said elastomeric bushing element;

a second central wall extension disposed along said inner support element toward said second end of said elastomeric bushing element and in axially-spaced relation to said first central wall extension;

a first recess surface disposed between said first central wall extension and said first outer edge along said first end of said elastomeric bushing element, said first recess surface at least partially defining an annular recess extending into said elastomeric connector element from along said first end of said elastomeric bushing element; and, a second recess surface disposed between said second central wall extension and said second outer edge along said second end of said elastomeric bushing element, said second recess surface at least partially defining an annular recess extending into said elastomeric connector element from along said second end of said elastomeric bushing element.

11. An elastomeric connector element according to claim 9, wherein said elastomeric connector element has an outside cross-sectional dimension (DOT), said flange cross-sectional dimension (DF) is within a range of approximately 110 percent to approximately 180 percent of said outside cross-sectional dimension; said flange offset dimension (OFF) is within a range of approximately 850 percent to approximately 1050 percent of said outside cross-sectional dimension, said radius of curvature (R1) is within a range of approximately 2500 percent to approximately 5850 percent of said outside cross-sectional dimension, said radius offset dimension (D1) is within a range of approximately 2500 percent to approximately 5850 percent of said outside cross-sectional dimension, said first unsecured edge dimension (D2) is within a range of approximately 2500 percent to approximately 5850 percent of said outside cross-sectional dimension, said second unsecured edge dimension (D3) is within a range of approximately 1450 percent to approximately 3650 percent of said outside cross-sectional dimension, and said base surface engagement dimension (D4) is within a range of approximately 850 percent to approximately 1200 percent of said outside cross-sectional dimension.

12. An elastomeric connector element according to claim 9, wherein said elastomeric connector element has an inside cross-sectional dimension (DIN), said flange cross-sectional dimension (DF) is within a range of approximately 40 percent to approximately 40 percent of said inside cross-sectional dimension, said flange offset dimension (OFF) is within a range of approximately 325 percent to approximately 400 percent of said inside cross-sectional dimension, said radius of curvature (R1) is within a range of approximately 975 percent to approximately 2225 percent of said inside cross-sectional dimension, said radius offset dimension (D1) is within a range of approximately 975 percent to approximately 2225 percent of said inside cross-sectional dimension, said first unsecured edge dimension (D2) is within a range of approximately 975 percent to approximately 2225 percent of said inside cross-sectional dimension, said second unsecured edge dimension (D3) is within a range of approximately 610 percent to approximately 900 percent of said inside cross-sectional dimension, and said base surface engagement dimension (D4) is within a range of approximately 325 percent to approximately 475 percent of said inside cross-sectional dimension.

13. An elastomeric connector element according to claim 9, wherein said elastomeric connector element has an axially-extending length (L1) extending between said outermost axial extent of said first outer edge and said base surface, said flange cross-sectional dimension (DF) is within a range of approximately 50 percent to approximately 85 percent of said axially-extending length, said flange offset dimension (OFF) is within a range of approximately 390 percent to approximately 475 percent of said axially-extending length, said radius of curvature (R1) is within a range of approximately 1150 percent to approximately 2675 percent of said axially-extending length, said radius offset dimension (D1) is within a range of approximately 1150 percent to approximately 2675 percent of said axially-extending length, said first unsecured edge dimension (D2) is within a range of approximately 1150 percent to approximately 2675 percent of said axially-extending length, said second unsecured edge dimension (D3) is within a range of approximately 725 percent to approximately 1075 percent of said axially-extending length, and said base surface engagement dimension (D4) is within a range of approximately 400 percent to approximately 575 percent of said axially-extending length.

14. An elastomeric connector element according to claim 9, wherein said elastomeric connector element includes a first central wall extension disposed along said inner support element, said first central wall extension extending from a first end surface disposed along said first end of said elastomeric bushing element toward said first side surface of said flange wall portion of said inner support element, and said elastomeric connector element has an axially-extending length (L2) extending between said first end surface of said first central wall extension and said base surface, said flange cross-sectional dimension (DF) is within a range of approximately 50 percent to approximately 85 percent of said axially-extending length, said flange offset dimension (OFF) is within a range of approximately 390 percent to approximately 475 percent of said axially-extending length, said radius of curvature (R1) is within a range of approximately 1150 percent to approximately 2675 percent of said axially-extending length, said radius offset dimension (D1) is within a range of approximately 1150 percent to approximately 2675 percent of said axially-extending length, said first unsecured edge dimension (D2) is within a range of approximately 1150 percent to approximately 2675 percent of said axially-extending length, said second unsecured edge dimension (D3) is within a range of approximately 725 percent to approximately 1075 percent of said axially-extending length, and said base surface engagement dimension (D4) is within a range of approximately 400 percent to approximately 575 percent of said axially-extending length.

15. A method of assembling a gas spring and damper assembly, said method comprising:
   providing a first end member, a second end member and a flexible spring member;
   securing said flexible spring member between said first and second end members to form a gas spring having a longitudinal axis and a spring chamber;
   providing a damper including a damper housing and a damper rod assembly operatively connected to one another such that said damper rod assembly and damper housing can undergo relative reciprocal motion;
   extending at least a portion of said damper through said spring chamber of said gas spring;
   securing said damper housing on said first end member of said gas spring;
   providing a damper rod bushing according to claim 9;
   securing said damper rod bushing on said second end member of said gas spring such that at least a portion of said damper rod bushing is disposed in fluid communication with said spring chamber such that pre-load forces due to gas pressure within said spring chamber act on said damper rod bushing; and,
   connecting said damper rod assembly to said damper rod bushing.

16. A method according to claim 15, wherein:
   securing said damper rod bushing on said second end member includes forming a substantially fluid-tight seal between said damper rod bushing and said second end member; and,
   connecting said damper rod assembly to said damper rod bushing includes forming a substantially fluid-tight seal between said damper rod bushing and said damper rod assembly.

\* \* \* \* \*